United States Patent [19]

Tausch

[11] 4,145,119

[45] * Mar. 20, 1979

[54] PERISCOPE BLACKOUT BLIND CONSTRUCTION

[75] Inventor: Gerald Tausch, Salem, Ohio

[73] Assignee: Miller - Holzwarth, Inc., Salem, Ohio

[*] Notice: The portion of the term of this patent subsequent to Jul. 5, 1994, has been disclaimed.

[21] Appl. No.: 840,673

[22] Filed: Oct. 11, 1977

[51] Int. Cl.$^2$ ............................................. G02B 5/08
[52] U.S. Cl. ..................................... 350/301; 350/65
[58] Field of Search ................. 350/52, 61, 65, 266, 350/269, 301, 302, 315, 321, 286, 287; 114/16 C; 250/519

[56] References Cited

U.S. PATENT DOCUMENTS

| | | | |
|---|---|---|---|
| 2,130,006 | 9/1938 | Gundlach | 350/302 |
| 4,033,677 | 7/1977 | Tausch | 350/301 |

FOREIGN PATENT DOCUMENTS 1910523  9/1970  Fed. Rep. of Germany ........... 350/269

*Primary Examiner*—F. L. Evans

*Attorney, Agent, or Firm*—Frease & Bishop

[57] ABSTRACT

A blackout blind is movably mounted within a periscope of an armor vehicle for covering the eyepiece viewing opening when not in use to prevent interior light from being emitted through the periscope and revealing the location of the vehicle. A transparent block of optical plastic material is mounted within a protective housing which extends through an opening in the vehicle armor. A viewing opening is formed in the housing portion located within the vehicle for observing an exterior field of view. A chamber and guide channels are formed within the housing by a space provided between the plastic block and housing walls and by a frame which extends along certain edges of the viewing opening. A blackout blind is slidably mounted and retained within this chamber and guide channels and is movable across the viewing opening between open and closed positions. The blind preferably is formed of an opaque polycarbonate sheet material which enables the blind to move through severe radius sizes when concealed within the housing without cracking, sticking or taking a set under severe weather and operating conditions.

12 Claims, 17 Drawing Figures

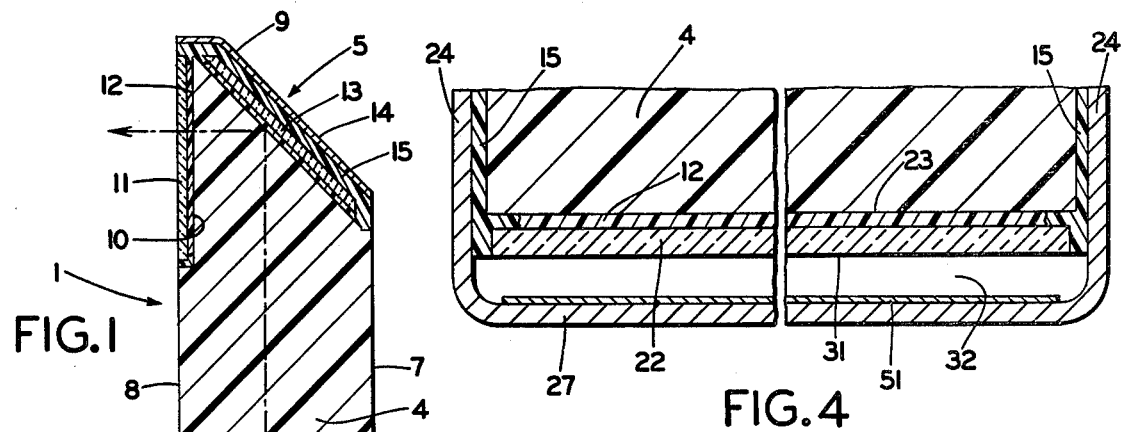
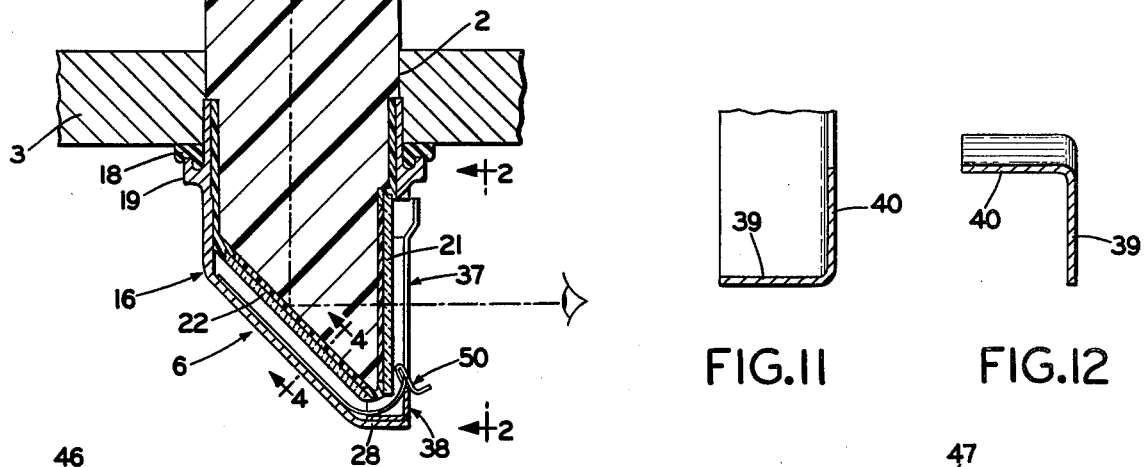
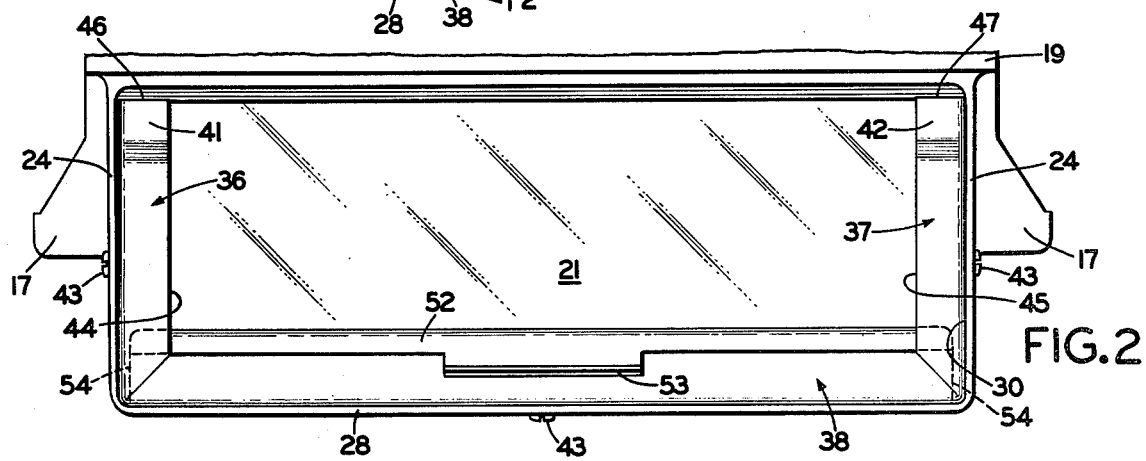
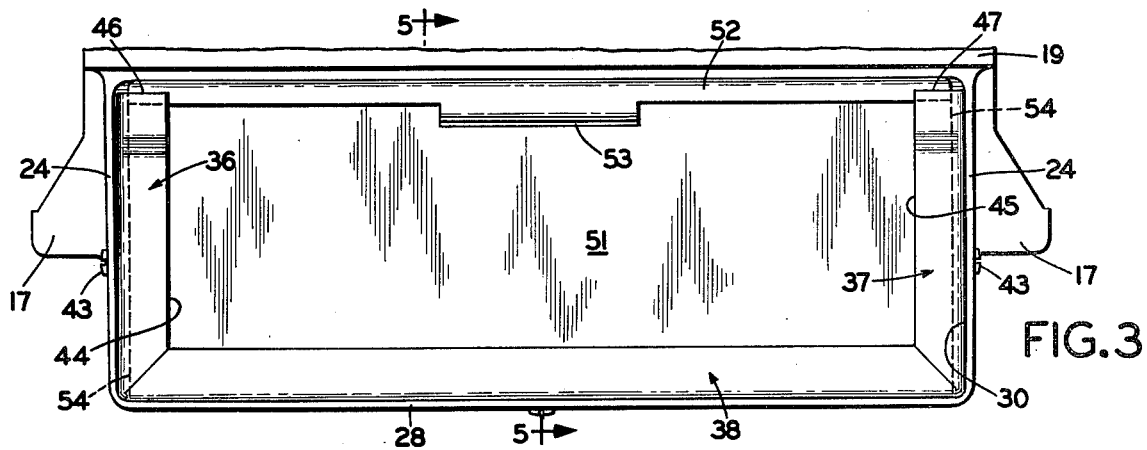

PERISCOPE BLACKOUT BLIND CONSTRUCTION

CROSS REFERENCE TO A RELATED PATENT

This invention is an improvement on my previous periscope blackout blind construction shown and described in U.S. Pat. No. 4,033,677, which is assigned to the same assignee as this application.

BACKGROUND OF THE INVENTION

1. Field of the Invention

The invention relates to periscopes for observing a field of view from within a protected structure and particularly to a periscope for armored vehicles. More particularly, the invention relates to a blackout blind mounted within the periscope for covering and exposing the eyepiece viewing opening to prevent light from being emitted from within the vehicle when the periscope is not in use.

2. Description of the Prior Art

Numerous periscope constructions have been developed and are in use for armored vehicles such as tanks. These periscopes contain various optical systems which enable the occupants to observe a field of view exterior of the vehicle without providing a direct opening through the armor for passage of projectiles, chemicals, liquids or other harmful materials. Many periscope constructions presently used on tanks, consist of a block of optical plastic mounted within a protective housing which extends through an opening in the tank. The observer views an exterior field of view through a window opening formed in an end portion of the housing located within the vehicle. These periscopes permit light to pass from the interior to the exterior of a tank as well as in the reverse direction, when viewing an object in the field of view. This presents a serious problem in that an internal light when emitted from a tank can be observed by an enemy and reveal the position of the tank. Modern light detection equipment in use by the military, is able to detect even small amounts of light in order to pinpoint an enemy's location. This problem requires eliminating or greatly reducing the amount of light possible within a tank, which light is necessary in many situations for map reading, etc., as well as for the general comfort and convenience of the crew.

Various shade and shutter constructions have been devised in an attempt to eliminate this problem. Makeshift flaps have been mounted above or adjacent the periscope viewing opening which are flipped up or down to cover the opening when not in use. These devices occupy critical space within the tank and are easily broken or damaged due to the severe shocks that the tank experiences. Also complete sealing and blackout is not always achieved.

Problems arose in attempting to mount a blackout blind within the interior of a periscope in that only a very small amount of space exists between the transparent periscope block and its protective housing. This limited space results in severe radii of curvature through which any such concealed blind must move when opening and closing the viewing window. The material required for the blind must be opaque and provide sufficient flexibility to move through such radii under operating conditions as low as −65° F, and heat well in excess of 165° F without becoming brittle or weak. Likewise, the blind material should be self-lubricating such as plastic to eliminate the need of any external lubrication. However, the blind must not crack or take a permanent set when kept in a bent position of the severe radii in such extremely cold temperatures, as do many types of plastics. It also is desirable that such a blackout blind construction be able to be incorporated within existing periscope designs and constructions without major modifications.

The periscope blackout blind construction shown and described in my U.S. Pat. No. 4,033,677 eliminates most of the above described problems and obtains the desired results. A minor problem has developed with this construction. When the periscope is subjected to tests simulating use in extremely sandy conditions, such as the desert, sand particles may collect between the blind and grid channel tracks within the periscope housing preventing smooth sliding operation of the blind. It is difficult to remove the blind and clean out the sand particles from within the housing due to the confined and inaccessible areas in which the blind travels.

No periscope construction of which I am aware eliminates these problems in a simple, effective and inexpensive manner by the use of a polycarbonate sheet movably mounted within a chamber formed within the periscope between the housing walls and transparent plastic block, and between a removable frame and eyepiece viewing surface adjacent an eyepiece viewing opening.

SUMMARY OF THE INVENTION

Objectives of the invention include providing a periscope construction for an armor vehicle having a blackout blind contained within the periscope housing and movable across the eyepiece viewing window to prevent interior light from being emitted from within the tank when the periscope is not in use; providing such a periscope construction in which a simple sheet metal frame forms a retaining guide between the housing and transparent block of the periscope, and which substantially eliminates any modifications to many existing periscope constructions; providing such a periscope construction having a blackout blind formed of a polycarbonate sheet which has sufficient flexibility to move about severe bends within the housing, which resists the taking of a permanent set when kept in such a severe bent position in extremely cold temperatures, which does not become excessively flexible upon experiencing high temperatures, and which is self-lubricating eliminating any external lubricant for its operation; providing such a periscope construction in which the blind can be removed easily from within the housing should it become damaged, without disassembling or removing the housing or periscope from its mounting on the vehicle; providing such a periscope construction in which a passage is formed within the periscope by a chamber or open space located between the housing walls and reflective surface of the eyepiece viewing section through which the blind travels in moving between open and closed positions, and in which the guide frame can be removed easily from the housing enabling sand and dirt particles to be cleaned from the chamber if it should become clogged with debris; and providing such a periscope blackout blind construction which is of an extremely simple, rugged, efficient and inexpensive construction, which eliminates difficulties, and solves problems and satisfies needs which have long existed in the art.

These objectives and advantages are obtained by the improved periscope construction, the general nature of which may be stated as including a block of optical material having eyepiece and object viewing sections located at generally opposite ends of said block, said eyepiece section having a viewing surface and a reflective surface forming an included acute angle therebetween; a protective housing enclosing portions of the eyepiece viewing section; opening means formed in the housing and aligned with the viewing surface; the housing having walls spaced from the reflective surface forming chamber means between said walls and reflective surface within the housing; frame means mounted on the housing and defining at least a portion of the viewing surface opening means, said frame means being spaced from the eyepiece viewing surface forming a pair of spaced guide channels between said frame means and eyepiece viewing surface; flexible opaque sheet means slidably mounted on the housing and movable within the spaced guide channels and the chamber means; and the sheet means being movable across the housing opening means between open and closed positions for exposing and covering the eyepiece viewing surface of the transparent block.

BRIEF DESCRIPTION OF THE DRAWINGS

A preferred embodiment of the invention — illustrative of the best mode in which applicant has contemplated applying the principle — is set forth in the following description and shown in the accompanying drawings, and is particularly and distinctly pointed out and set forth in the appended claims.

FIG. 1 is a vertical sectional view of the improved periscope construction mounted on a portion of a vehicle, with the blackout blind shown in open position;

FIG. 2 is an enlarged fragmentary front elevation looking in the direction of arrows 2—2, FIG. 1, of the eyepiece viewing window with the blackout blind in open position;

FIG. 3 is a view similar to FIG. 2 showing the blackout blind in closed position;

FIG. 4 is a greatly enlarged fragmentary sectional view taken on line 4—4, FIG. 1

FIG. 11 is an enlarged fragmentary sectional view taken on line 11—11, FIG. 7;

FIG. 12 is an enlarged sectional view taken on line 12—12, FIG. 7;

Similar numerals refer to similar parts throughout the drawings.

DESCRIPTION OF THE PREFERRED EMBODIMENT

Figure 5:
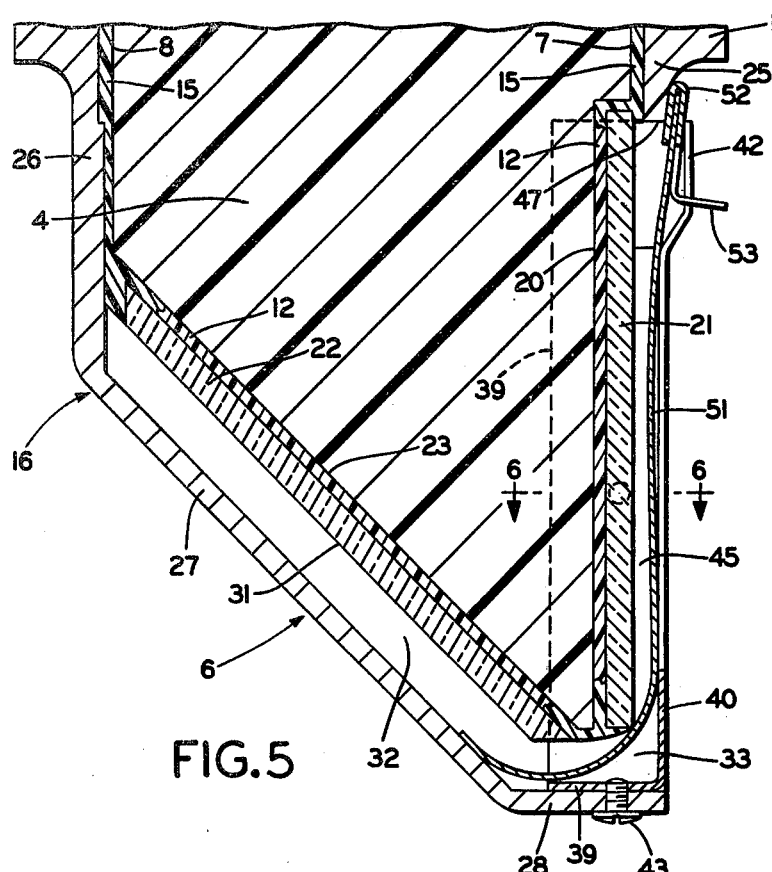
FIG. 5 is an enlarged fragmentary sectional view taken on line 5—5, FIG. 3.
Figure 6:
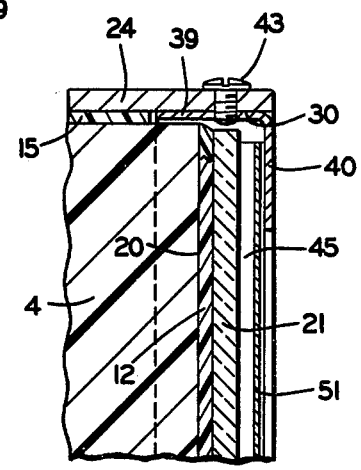
FIG. 6 is a greatly enlarged fragmentary sectional view taken on line 6—6, FIG. 5.

The improved periscope construction is indicated generally at 1, and is shown in vertical section in FIG. 1 mounted within an opening 2 of an armor plate 3. Periscope 1 includes a main transparent body 4 formed of a clear plastic material of optical quality such as methyl methacrylate. Body 4 has an upper object viewing section and a lower eyepiece viewing section, indicated generally at 5 and 6, respectively. Body 4 preferably has a generally rectangular shape formed with opposed parallel front and rear planar surfaces 7 and 8 and a pair of opposed parallel planar end surfaces.

Object viewing section 5 is contained with a protective housing cover 9 and has a recessed object viewing surface 10 with a clear window 11 being mounted thereon by a clear optical adhesive 12. A reflective mirror 13 is mounted on an angled top planar surface 14 of body 4 by a sealing adhesive 15.

Eyepiece viewing section 6 is contained within a protective housing cover, indicated generally at 16, which is secured to armor plate 2 by a pair of end mounting lugs 17 (FIGS. 2 and 3). A rectangular rubber sealing gasket 18 is mounted between armor plate 3 and a gasket mounting flange 19 formed on housing 16 (FIG. 1) for effectively sealing armor plate opening 2.

Eyepiece viewing section 6 (FIG. 5) includes a recessed vertically extending planar viewing surface 20 formed in surface 7, with a clear window glass 21 being mounted thereon by optical adhesive 12 in a similar manner as window glass 11 of object viewing section 5. A second reflective mirror 22 is mounted on angled bottom surface 23 of body 4 by adhesive 12.

Housing cover 16 includes spaced end walls 24 (FIG. 2) on which mounting lugs 17 are mounted and spaced vertically extending front and rear walls 25 and 26 (FIG. 5), respectively. Walls 25 and 26 are parallel with and secured to front and rear surfaces 7 and 8 of body 4 by a sealing adhesive 15. Rear wall 26 includes an angled end wall section 27 which extends parallel with angled bottom surface 23 and reflective mirror 22 of body 4. Rear wall 27 terminates in a horizontally extending bottom wall 28. The edges of end walls 24 and bottom wall 28, together with front wall 25 define a window opening 30 (FIGS. 2 and 3) which aligns with eyepiece viewing glass 21 and viewing surface 20 of viewing section 6.

The components described above are illustrative of one type of known periscope construction in which the improved blackout blind may be mounted with the various surfaces and components being referred to as front, back, vertical, horizontal, etc., in accordance with their position as shown in the drawings. These directional descriptions are not limiting features thereof since the periscope may be mounted in various positions and angles on the vehicle body and are indicated as such for clarity and understanding.

In accordance with the invention, angled rear wall section 27 is spaced from the back surface 31 of mirror 22 and forms a main chamber section 32 therebetween. Chamber section 32 extends throughout the length of inclined wall 27 (FIG. 5) and throughout the width of lower housing 16 between end walls 24 (FIG. 4). Bottom wall 28 is spaced from the lower ends of mirror 22 and window glass 21 forming a horizontal secondary chamber section 33 therein (FIG. 5). Chamber section 33 also extends throughout the width of housing 16 between end walls 24 and communicates with main chamber section 32.

Figure 7:
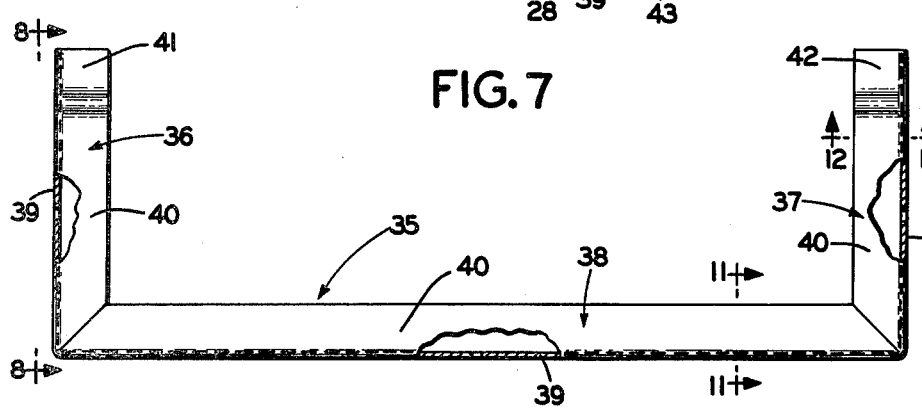
FIG. 7 is a front elevational view of the guide channel frame which slidably mounts the blackout blind, shown removed from the periscope housing.
Figure 8:
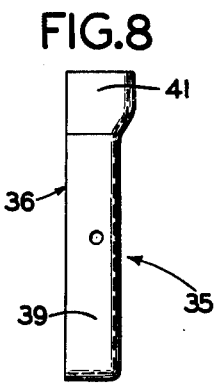
FIG. 8 is an end elevation of the guide channel frame looking in the direction of arrows 8—8, FIG. 7.

In further accordance with the invention, a U-shaped frame, indicated generally at 35 (FIGS. 7 and 8), is mounted on lower housing portion 16 adjacent eyepiece viewing surface 20. Frame 35 is formed of sheet metal and includes a pair of vertically extending leg members 36 and 37, and a connecting horizontal web 38. Legs 36–37 and web 38 are L-shaped in cross section (FIGS. 11 and 12) formed by integral flanges 39 and 40. Flanges 39–40 are notched at the junctions of the leg members and web and then formed into the U-shaped configuration of FIG. 7. The upper ends of legs 36 and 37 are formed with outwardly and upwardly curved ends 41 and 42, respectively.

Frame 35 is mounted within housing window opening 30 by a plurality of screws 43, three of which are shown in the drawings. Screws 43 extend through housing bottom wall 28 and end walls 24 and through flange 39 of web 38 and leg members 36–37. When frame 35 is mounted on housing 16, flanges 40 of leg members 36 and 37 are spaced outwardly from window glass 21 and form a pair of spaced guide channels 44 and 45, respectively, along the edges of eyepiece viewing surface 20 and housing window opening 30. Enlarged upper leg ends 41 and 42 form top openings 46 and 47 at the ends of guide channels 44 and 45, respectively. Flange 40 of horizontal web 38 extends vertically upwardly from bottom wall 28 generally parallel with window glass 21 and eyepiece viewing surface 20.

Frame 35 forms a pair of spaced guide channels 44 and 45 which extend vertically along the edges of window opening 30, adjacent to and spaced from window glass 21 and eyepiece viewing surface 20, and communicate at their lower ends with secondary horizontal chamber section 33 (FIG. 5). Chamber section 33 in turn communicates with upwardly rearwardly inclined main chamber 32. Main chamber section 32 is located at an included acute angle with respect to guide channels 44–45 generally equal to the included angle between eyepiece viewing surface 20 and the reflective surface of mirror 22.

Figure 9:
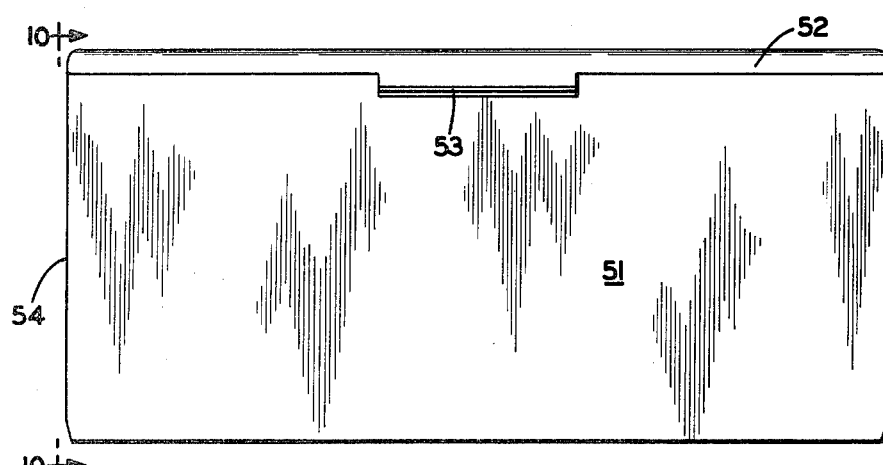
FIG. 9 is a plan view of the blackout blind removed from the periscope.
Figure 10:
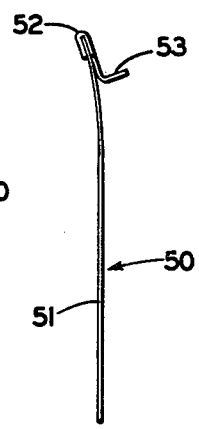
FIG. 10 is an end elevation of the blackout blind looking in the direction of arrows 10—10, FIG. 9.

A blackout blind, indicated generally at 50 (FIGS. 9 and 10), is slidably mounted within guide channels 44 and 45 for movement between an open position (FIGS. 1 and 2) and a closed position (FIGS. 3 and 5) for exposing and covering viewing surface 20 of eyepiece viewing section 6. Blackout blind 50 includes a rectangular flexible sheet of material 51 having a U-shaped metal reinforcing flange 52 mounted on one edge thereof with an outwardly projecting finger tab 53.

It has been found that deformation of sheet 51 of a polycarbonate material provides the desired characteristics for most efficient operation of improved periscope construction 1. Sheet 51 preferably is a polycarbonate film having a range of thicknesses, the amount of which depends upon the severity of the radius through which sheet 51 passes between guide channels 44–45 and chamber sections 32–33 when moving between open and closed positions. Sheet 51 preferably is of the type of material sold by General Electric Company under the trademark Lexan, or by the Rohm and Haas Company under the trademark Tuffak. This particular polycarbonate sheet material has been found to provide the flexibility and strength required throughout the range of temperatures to which blind 50 will be subjected. Blind 50 must be able to withstand extremely cold temperatures of $-65°$ F or lower to temperatures in excess of $165°$ F without cracking or taking a permanent set when kept in a severely bent position in such cold temperatures as does various types of plastic sheeting, and without serious loss of strength in extreme heat. This material also is self-lubricating, as is plastic, eliminating the need for any external lubricant.

Blind 50 is slidably mounted between guide frame 35 and eyepiece viewing glass 21 with side edges 54 of blind 50 being located within spaced guide channels 44 and 45 when in closed position, as shown in FIG. 5. Reinforced sheet metal edge 52 of blind 50, when in closed position (FIGS. 3 and 5) may project outwardly through top openings 46 and 47 of channel legs 36 and 37 and engage gasket mounting flange 19 and the edge of housing front wall 25. Openings 46 and 47 permit blind 50 to be removed from its containment within guide channels 44 and 45 and replaced should it become damaged, without any disassembling being required on housing 16.

Eyepiece viewing window glass 21 and mirror 22, which are mounted on surfaces 20 and 23, respectively, of eyepiece viewing section 6 (FIG. 5), form an acute included angle therebetween. Sheet 51 of blind 50 must curve about this angle in moving between vertical straight guide channels 44–45, horizontal chamber section 33 and inclined chamber section 32. This radius of curvature in most periscope design is severe due to the extremely confined and limited space between housing walls 27 and 28 and body 4. The range of the radii of curvature through which blind sheet 51 must bend will vary generally between $\frac{1}{4}$ inch and $1\frac{1}{4}$ inches for most periscope constructions in which blackout blind 50 will be incorporated. It is this severe radius of curvature around which sheet 51 must pass when blind 50 moves between opened and closed positions which presents a serious problem to the type of material of sheet 51. The polycarbonate sheets described above have been found to be most efficient and satisfactory for these perimeters. As an example, a polycarbonate sheet having a thickness of 0.015 inches has been found to be most efficient for a channel radius of 9/16 inches. Correspondingly, the larger the radius of curvature, greater may be the thickness of sheet 51. The inside surfaces of the channel legs 36 and 37 may be coated with a friction reducing material to reduce the sliding friction existing between these surfaces and sheet edges 54 if desired.

Blind 50 is operated easily by an individual within the protected vehicle by pulling downwardly on finger tab 53 to move blind 50 from the closed position of FIGS. 3 and 5 to the open position of FIGS. 1 and 2. Sheet 51 slides along guide channels 44–45 and within chamber sections 33–32 until it is generally concealed within housing cover 16. There are no projections except for finger tab 53 which extends into the interior of the vehicle to occupy space and which are subject to breakage as in prior constructions. Tab 53 merely is pulled upwardly to the position of FIG. 5 to cover viewing surface 20 and glass 21, preventing the emitting of light therethrough which could be visible by an ememy.

In accordance with one of the main features of the invention, frame 35 can be removed easily from its mounting on lower housing portion 16 by removal of attachment screws 43. After removal of frame 35, blind 50 then can be removed extremely easily providing easy access into chamber sections 32 and 33 for removal of any sand, dirt or other debris which may have collected therein. Such cleaning is not easily performed in my other periscope blackout blind construction. After cleaning of chambers 32 and 33, frame 35 and blind 50 then are replaced for continued operation of periscope 1. It can be seen by a review of FIGS. 2, 3, 4 and 5 that removal of frame 35 and blind 50 provides direct access into and along the entire length of chamber section 33 and also direct access into inclined chamber section 32.

Frame 35 and blind 50 can be removed from periscope 1 without removing the periscope from its mounted position within opening 2 of armor plate 3, and without removal or relocation of any other components of the periscope optical system and housing. Frame 35 also is of an extremely simple, rugged and inexpensive construction in contrast to the somewhat more complicated guide channel frame of my previous periscope blackout blind construction.

Frame 35, together with chamber sections 32 and 33 formed within protective housing 16 between the optical components and inner housing walls, provides the guide ways and storage areas for the blackout blind without appreciably modifying existing periscope constructions and without additional expensive and elaborate guide components, and enables the guide and storage areas to be cleaned of all dirt and debris which may accumulate therein over periods of time due to the harsh environments to which they are subjected.

Figure 14:
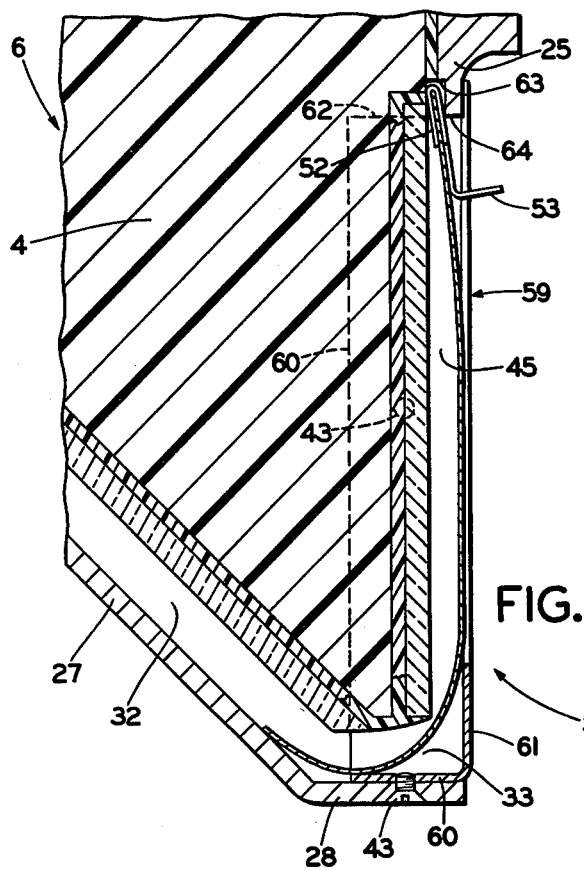
FIG. 14 is an enlarged fragmentary sectional view, similar to FIG. 5, taken on line 14—14, FIG. 13.
Figure 15:
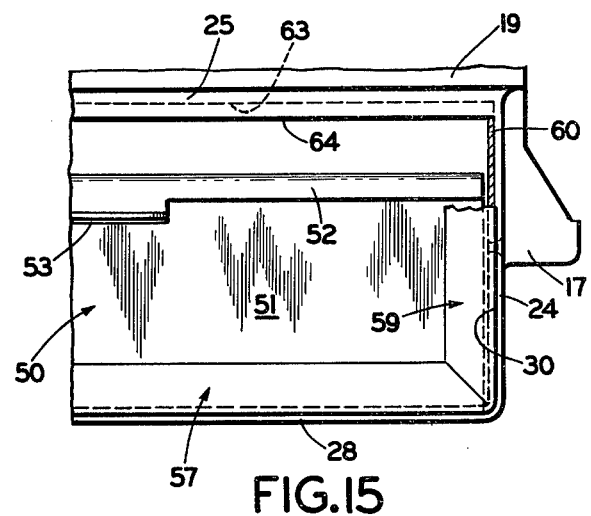
FIG. 15 is a fragmentary view with portions broken away, of the upper right hand corner of FIG. 13, with the blind shown in partially open position.
Figure 13:
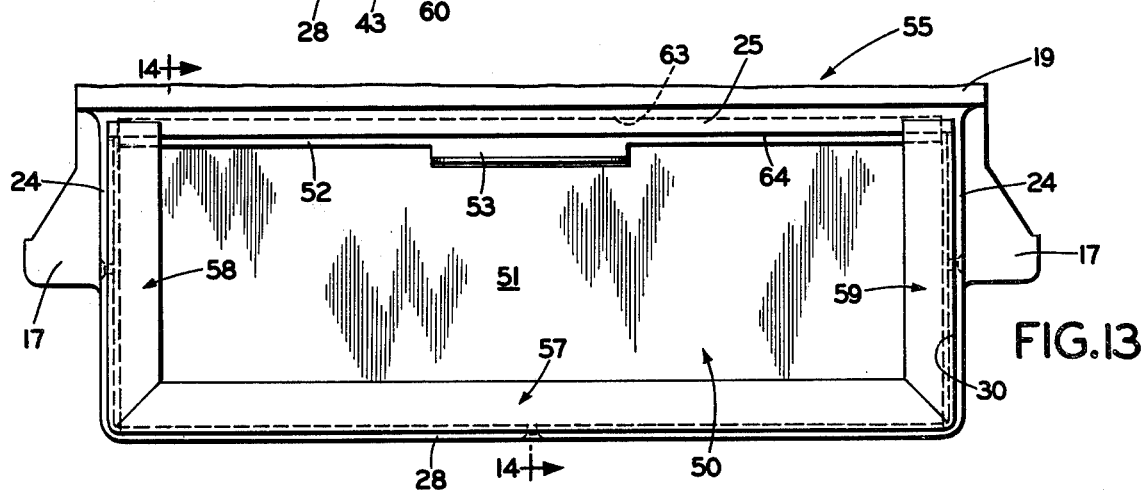
FIG. 13 is a fragmentary front elevational view, similar to FIG. 3, having a modified guide channel frame mounted therein.
Figure 16:
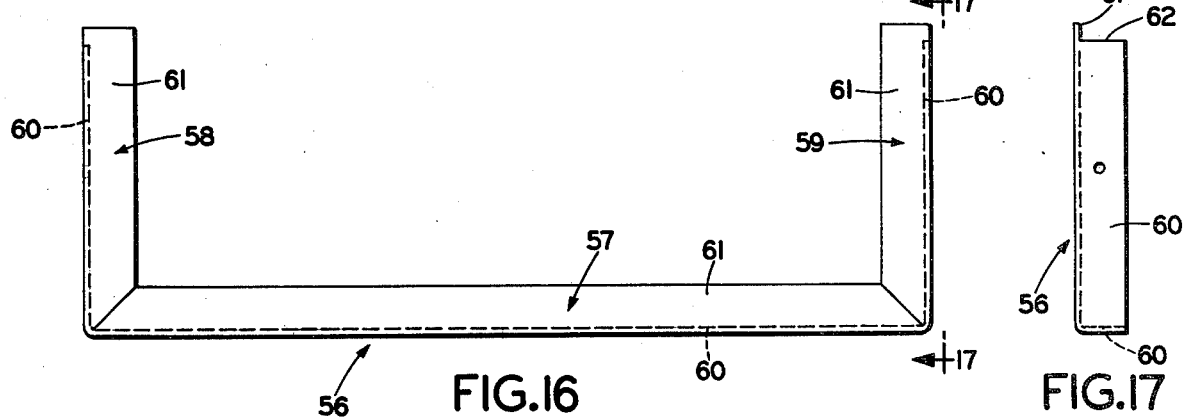
FIG. 16 is a front elevational view of the modified guide channel frame removed from the periscope housing, similar to FIG. 7.
Figure 17:
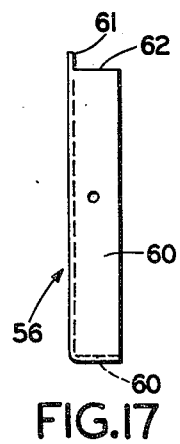
FIG. 17 is an end elevation of the modified guide channel frame looking in the direction of arrows 17—17, FIG. 16.

A slightly modified form of the invention, indicated generally at 55, is shown particularly in FIGS. 13 and 14. Periscope construction 55 is similar to construction 1 in nearly all respects except for a modified channel forming guide frame indicated at 56 (FIGS. 16 and 17). Channel frame 56 is generally similar to frame 35, having a U-shaped configuration with a connecting web 57 and a pair of spaced legs 58 and 59. Web 57 and legs 58–59 are formed from an L-shaped strip of sheet metal which is bent into the U-shaped configuration, as is frame 35. The L-shaped metal strip is formed by flanges 60 and 61.

The difference between frame 56 and frame 35 is that the upper ends of legs 58 and 59 are not enlarged as are leg ends 41 and 42 of leg members 36 and 37. The upper ends of leg flanges 60 are notched at 62 (FIG. 17) imparting a longer length to leg flanges 61 than that of leg flanges 60.

A slot 63 is formed in housing front wall 25 adjacent to eyepiece viewing section 6 and extends along the length of the horizontal upper edge of viewing window opening 30. Frame 56 is removably mounted within window opening 30, as is frame 35, by a plurality of screws 43, as shown in the drawings. Other types of clips or other fastening means may be used to mount frames 35 and 56 in window opening 30 without departing from the concept of the invention. The top edges of leg flanges 60 adjacent notches 62, engage the lower edge 64 of front wall 25 (FIG. 14) with the extended ends of leg flanges 61 lying in overlapping relationship with respect thereto.

Blackout blind 50 is located within the spaced guide channels 44 and 45 which are formed by legs 58 and 59, respectively, of frame 56 and within chamber sections 32 and 33, as in periscope construction 1 described above. The blind reinforcing flange 52 is seated within slot 63 when blind 50 is in the closed position of FIGS. 13 and 14, which provides a tighter closure than with the construction shown in FIG. 7. The upper leg ends of frame 56 also do not project outwardly from the eyepiece viewing section as in frame 35 which may reduce the amount of sand and dirt which enters guide channels 44 and 45.

Frame 56 must be removed from its mounting within window opening 30 for replacement of blind 50 in periscope construction 55, whereas in periscope construction 1 blind 50 can be removed through top openings 46 and 47 formed by enlarged leg ends 41 and 42.

Accordingly, the improved periscope construction contains a blackout blind slidably mounted on and contained within the protective housing of the periscope and slidably movable between open and closed positions; provides a construction in which the blind is formed of a polycarbonate sheet of material able to withstand a wide range of temperatures without cracking or taking a permanent set when maintained in an extremely bent position for long periods of time, and which has self-lubricating properties; provides such a construction in which the blackout blind is slidably mounted within an inexpensive and rugged sheet metal guide channel frame which is removably mounted on the front of the housing within the eyepiece viewing window opening; provides such a construction in which the guide frame and blind can be removed easily and rapidly from its mounting on the periscope housing without any disassembling or removal of the periscope or its components and in which no components project into the interior of the vehicle to occupy space and become damaged; provides a means for cleaning the interior chamber through which the blind travels, when moving between open and closed positions, of all dirt and debris should it become clogged with the same; and provides such a structure which is of an extremely simple, rugged and inexpensive configuration, which eliminates difficulties encountered with prior devices, achieves the objectives indicated and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved periscope blackout blind construction is constructed and used, the characteristics of the construction, and the advantageous, new and useful results obtained; the new and useful structures, devices, elements, arrangements, parts, and combinations, are set forth in the appended claims.

I claim:
1. A periscope construction including:
   (a) a block of optical material having eyepiece and object viewing sections located at generally opposite ends of said block, said eyepiece section having a viewing surface and a reflective surface forming an included acute angle therebetween;
   (b) a protective housing enclosing portions of the eyepiece viewing section;
   (c) opening means formed in the housing and aligned with the viewing surface;

(d) the housing having walls spaced from the reflective surface forming chamber means between said walls and reflective surface within the housing;

(e) frame means removably mounted on the housing and defining at least a portion of the viewing surface opening means, said frame means being spaced from the eyepiece viewing surface forming a pair of spaced guide channels between said frame means and eyepiece viewing surface;

(f) flexible opaque sheet means slidably mounted on the housing and movable within the spaced guide channels and the chamber means; and (g) said sheet means being movable across the opening means between open and closed positions for exposing and covering the eyepiece viewing surface of the transparent block.

2. The construction defined in claim 1 in which the frame means is a U-shaped member having a pair of spaced legs and a connecting web; and in which the legs form the pair of spaced guide channels.

3. The construction defined in claim 1 in which the housing walls include an angled rear wall spaced from and extending generally parallel with the reflective surface and forming a main section of the chamber means therebetween; and a bottom wall extending outwardly from the angled rear wall and spaced from the eyepiece viewing and reflective surfaces forming a secondary section of the chamber means therebetween, with said secondary section communicating with and joining the main section of the chamber means with the spaced guide channels.

4. The construction defined in claim 3 in which the housing walls also include a pair of spaced end walls which enclose the ends of the main and secondary sections of the chamber means.

5. The construction defined in claim 3 in which the main section of the chamber means and the guide channels are located at an included acute angle with respect to each other generally equal to the included angle between the eyepiece viewing surface and reflective surface.

6. The construction defined in claim 1 in which the sheet means is formed of a polycarbonate film.

7. A periscope construction including:
(a) housing means having at least front and rear walls forming an acute included angle therebetween;
(b) optical means mounted within the housing means having first and second reflective surfaces on opposite ends of the housing means for observing a field of view from within a protective vehicle;
(c) an eyepiece viewing opening formed in the housing means front wall and aligned with the first reflective surface;
(d) frame means removably mounted on the housing means and defining a portion of the eyepiece viewing opening, said frame means including a pair of spaced vertical leg members;
(e) a pair of spaced guide channels being formed by the vertical leg members adjacent the eyepiece viewing opening;
(f) the housing means rear wall being spaced from the first reflective surface forming chamber means within the housing means, said chamber means located between and extending along said rear wall and first reflective surface, and communicating with the spaced guide channels; and
(g) flexible opaque sheet means slidably mounted within the spaced guide channels and chamber means and movable between open and closed positions, said sheet means covering the eyepiece viewing opening when in closed position preventing light from within a protective vehicle from passing through the viewing opening and into the optical means.

8. The construction defined in claim 7 in which the front wall viewing opening has a generally rectangular shape and lies in a vertical plane; in which the rear wall has an inclined planar portion and a horizontal portion connecting said inclined planar portion with the front wall; and in which the chamber means is located between the optical means and the horizontal and inclined portions of the rear wall.

9. The construction defined in claim 7 in which the optical means includes a block of transparent plastic having eyepiece and object viewing sections formed at opposite ends of said block; in which the eyepiece viewing section includes a vertically extending viewing surface aligned with the housing means front wall opening; and in which the opaque sheet means covers said viewing surface when in closed position.

10. The construction defined in claim 7 in which the opaque sheet means is formed of a polycarbonate film.

11. The construction defined in claim 7 in which the frame means is a U-shaped sheet metal member; and in which fastening means removably mount the frame means on the housing means.

12. The construction defined in claim 11 in which a reinforcing flange is mounted on one end of the sheet means; in which slot means is formed in the housing means front wall adjacent to and extending along the eyepiece viewing opening; and in which the reinforcing flange is received within the slot means when the sheet means is in closed position.

* * * * *

UNITED STATES PATENT AND TRADEMARK OFFICE
CERTIFICATE OF CORRECTION

PATENT NO. : 4,145,119
DATED      : March 20, 1979
INVENTOR(S) : Gerald Tausch

It is certified that error appears in the above-identified patent and that said Letters Patent are hereby corrected as shown below:

Column 4, line 20, change "with" to --within--;

Column 4, line 28, change "2" to --3--;

Column 5, line 57, change "deformation" to --formation--; and

Column 6, line 32, change "design" to --designs--.

Signed and Sealed this

Twenty-second Day of May 1979

[SEAL]

Attest:

RUTH C. MASON
Attesting Officer

DONALD W. BANNER
Commissioner of Patents and Trademarks